Sept. 2, 1958     S. REISNER     2,849,825

FISH HOOK KEEPER

Filed Oct. 11, 1957

INVENTOR.
SAM REISNER

BY

*Elliott & Pastoriza*
ATTORNEYS

United States Patent Office 2,849,825
Patented Sept. 2, 1958

2,849,825

FISH HOOK KEEPER

Sam Reisner, Pacific Palisades, Calif.

Application October 11, 1957, Serial No. 689,604

5 Claims. (Cl. 43—25.2)

This invention relates to a receptacle for temporarily retaining fishing hooks and more particularly to an improved fish hook keeper for confining a fish hook while it is still connected to a fishing pole line.

In traveling to or from fishing streams or lakes and the like, as well as in assembling various fishing gear, it is desirable to prevent fish hooks on the ends of fishing pole lines from dangling needlessly and possibly catching on clothing and the like. While the fish hook may be physically disconnected from the line and stored when not in use, such a procedure is annoying and time consuming when it is only desired to temporarily suspend fishing operations for one reason or another.

Bearing the above in mind, it is a primary object of the present invention to provide an improved fish hook keeper for enabling the convenient and ready temporary confining of a fish hook without the necessity of disconnecting the hook from the fishing line.

More particularly, it is an object to provide a keeper of the above type which is extremely simple to open and close manually and which includes means for fixing the same to the fishing pole itself whereby any tangling of the line or swinging movement of the keeper at the end of the line is avoided.

These and many other objects and advantages of the present invention are attained by providing a keeper in the form of first and second half sections pivoted together for movement in the common plane of their opposing faces. At least one of the half sections is recessed to receive a fishhook and also includes a small slot at a peripheral portion thereof through which the fish hook line may pass. A single securing means serves the dual function of holding the fish hook within the recessed area and also holding a spring grip to the exterior of one of the half sections which in turn will enable the keeper to be temporarily fixed to the fishing pole or rod.

The provision of half sections which are pivoted in a common plane will enable the keeper to be opened or closed with one hand by a single manual movement. Preferably, one of the half sections includes a retaining means in the form of a bent strip which serves to frictionally retain the half sections together in their closed position.

Figure 1:
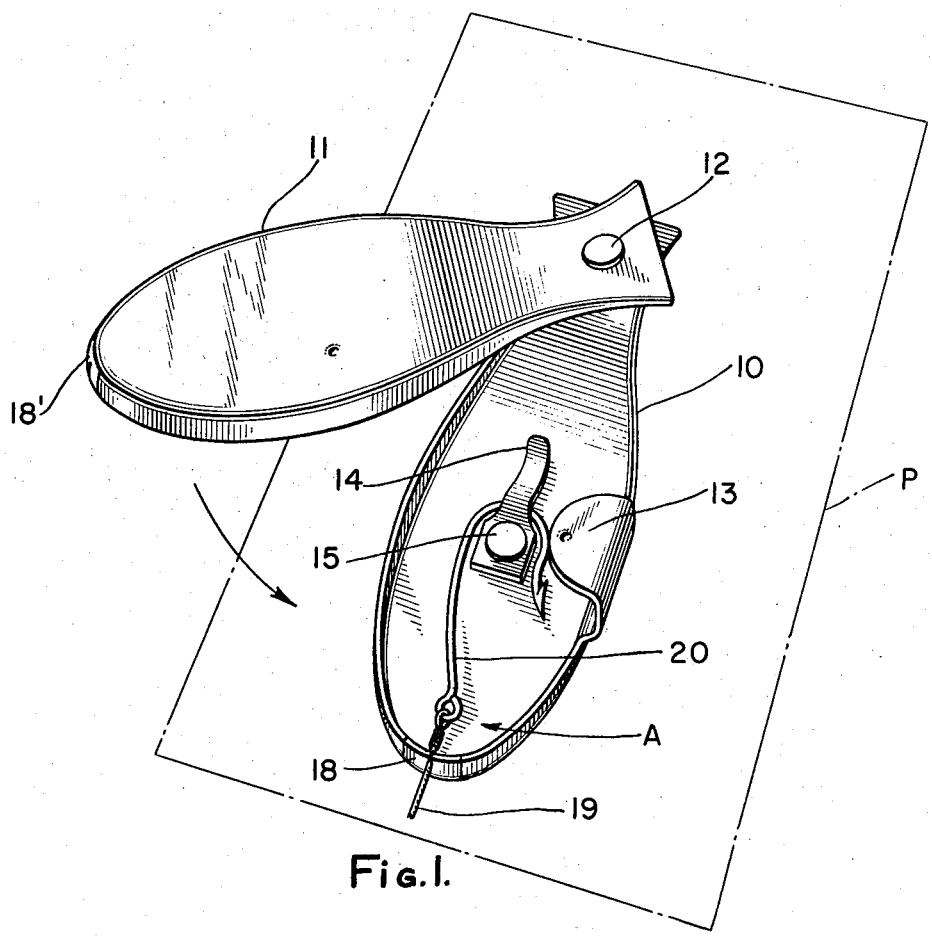
Figure 2:
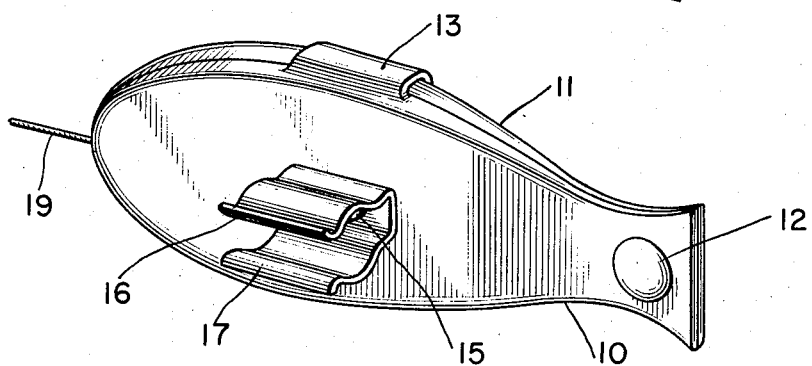

A better understanding of the invention will be had by referring to a preferred embodiment thereof as illustrated in the accompanying drawings, in which:

Figure 1 is a perspective view of the fish hook keeper in open position illustrating a fish hook positioned therein; and Figure 2 is another perspective view of the keeper looking from the bottom portion thereof when in closed position.

Referring to both Figures 1 and 2, the keeper comprises first and second half sections 10 and 11 which, for aesthetic reasons, may be generally in the shape of a small fish. As shown, these half sections are pivoted at 12 for swinging movement in the common plane of their opposing faces from an open position, such as illustrated in Figure 1, to a closed position such as illustrated in Figure 2. The common plane of the opposing faces is designated P in Figure 1.

The half section 10 may include a retaining means in the form of a tab 13 extending upwardly and normally to the plane P from one side edge of one of the half sections and thence bent inwardly to extend in a direction parallel to the plane P. The under portion of the bent part of the tab receives the opposing edge of the other half section 11 when the same is in closed position as shown in Figure 2. The tab 13 is preferably of spring material such that it will frictionally retain the half sections 10 and 11 in closed position, but is designed such that manual shearing forces exerted on the two half sections is sufficient to overcome this friction and enable ready opening of the sections.

As shown best in Figure 1, the half sections are recessed such as at A for the half section 10. Within the recess A, there is provided a fish hook holding means in the form of a spring clip 14 secured as by a rivet 15 within the recess. As will be evident from Figure 2, this same securing rivet passes through the half section to the exterior thereof to secure a spring grip comprising grip arms 16 and 17. This spring grip is designed to encircle a fishing pole or rod and thus serve to temporarily fix the keeper to the pole.

Referring once again to Figure 1, the front peripheral portions of the half sections 10 and 11 are provided with small flexible rubber lips 18 and 18' which define a slot or lip opening to receive a fishing line 19 when the same is secured to a hook 20 positioned within the sections.

In use, the half sections 10 and 11 may be swung to an open position as indicated in Figure 1 and the fish hook 20 inserted under the spring clip 14. The line 19 is positioned to pass between the rubber lips 18 and 18' to the exterior of the keeper. The half section 11 may then be swung about the pivot point 12 under the retaining tab 13 to the position illustrated in Figure 2 with the line 19 protruding from the lips 18 and 18'. The spring grip arms 16 and 17 are then pushed about the fishing pole or rod to temporarily fix the keeper thereto in an out of the way position.

When it is desired to use the hook, the keeper is simply manually pulled from the rod and the half section 11 swung from the half section 10 as by the thumb of one hand. The fish hook 20 may then be readily removed from the interior recessed area A and the keeper itself then closed and reclipped to the pole if desired or temporarily stored.

The entire structure is relatively simple and employs a minimum number of parts and thus may be manufactured very inexpensively. Further, the unique design as described enables simple operation with one hand to open or close the keeper.

Various modifications that fall within the scope and spirit of this invention will readily occur to those skilled in the art. The fish hook keeper is, therefore, not to be thought of as limited to the specific embodiment set forth for illustrative purposes.

What is claimed is:

1. A fish hook keeper comprising, in combination: first and second recessed half sections pivoted together for swinging movement from an open to a closed position; a fish hook holding means for temporarily holding said fish hook; a spring grip means adapted to fix said keeper to a fishing pole; and securing means passing through one of said sections from its interior to its exterior for simultaneously securing said fish hook holding means within said interior and said spring grip means to said exterior.

2. A fish hook keeper according to claim 1, in which one of said half sections includes a peripheral opening for receiving a fishing line when said fish hook is positioned within said half sections.

3. A fish hook keeper for temporarily storing a fish hook connected to a fishing pole line, comprising, in combination: first and second half sections; means pivoting opposing faces of said half sections together for swinging movements in the common plane of said opposing faces to a closed position in which said opposing faces are in face to face engagement and to an open position in which substantial portions of said opposing faces are exposed, at least one of said sections having a recessed area in its opposing face and a flexible lip in one peripheral portion thereof in communication with said recessed area; and hook holding means secured to one of said half sections within said recessed area for receiving said fish hook, said line passing by said flexible lip.

4. The combination of claim 3, including spring grip means for temporarily fixing said keeper to said fishing pole, said hook holding means including a securing portion passing through said recessed area to the exterior of one of said half sections to secure said spring grip means thereto.

5. The combination of claim 4, including a retaining tab means rigidly secured to a side portion of one of said half sections and extending normally upwardly from the common plane of said opposed faces and bent at right angles to extend substantially parallel to said common plane to define a receiving area under the bent portion thereof to receive and frictionally retain the opposed side portion of the other of said half sections when said half sections are pivoted to said closed position.

No references cited.